United States Patent [19]

Aaen et al.

[11] 3,939,720

[45] Feb. 24, 1976

[54] VARIABLE TRANSMISSION DRIVE PULLEY ASSEMBLY WITH SELECTIVE DRIVE

[75] Inventors: Olav Aaen, Kenosha, Wis.; Edgar Rose, Glencoe, Ill.

[73] Assignee: Outboard Marine Corporation, Waukegan, Ill.

[22] Filed: July 26, 1974

[21] Appl. No.: 492,030

[52] U.S. Cl. .................................. 74/230.17 E
[51] Int. Cl.² .................................. F16H 55/52
[58] Field of Search ............ 74/230.17 E, 230.17 M, 74/230.17 F, 230.17 R, 230.17 B, 230.17 C, 230.17 D, 217 CV; 192/105 B, 103 A

[56] References Cited
UNITED STATES PATENTS

| | | | |
|---|---|---|---|
| 3,362,242 | 1/1968 | Watkins | 74/230.17 E |
| 3,653,283 | 4/1972 | Betz | 74/230.17 M |
| 3,675,500 | 7/1972 | Albertson | 74/230.17 E |
| 3,698,256 | 10/1972 | Albertson | 74/230.17 E |
| 3,709,052 | 1/1973 | Lassanske | 192/105 B |
| 3,750,486 | 8/1973 | Belanger et al. | 74/230.17 E |
| 3,777,583 | 12/1973 | Talbot | 74/230.17 E |
| 3,824,867 | 7/1974 | Brooks | 74/230.17 E |
| 3,830,112 | 8/1974 | Ward | 74/230.17 E |

*Primary Examiner*—Samuel Scott
*Assistant Examiner*—A. Russell Burke
*Attorney, Agent, or Firm*—Michael, Best & Friedrich

[57] ABSTRACT

Disclosed herein is a variable transmission drive pulley assembly comprising a fixed sheave connected to a drive shaft for common rotation therewith, a movable sheave carried by the drive shaft for movement axially thereof relative to a retracted position spaced from the fixed sheave, a spring urging the movable sheave toward the retracted position in the direction away from the fixed sheave, speed responsive means for displacing the movable sheave toward the fixed sheave, means for modifying the effectiveness of the speed responsive means, and selectively operable control means for controlling operation of the speed responsive means and the means for modifying the effectiveness of said speed responsive means.

30 Claims, 11 Drawing Figures

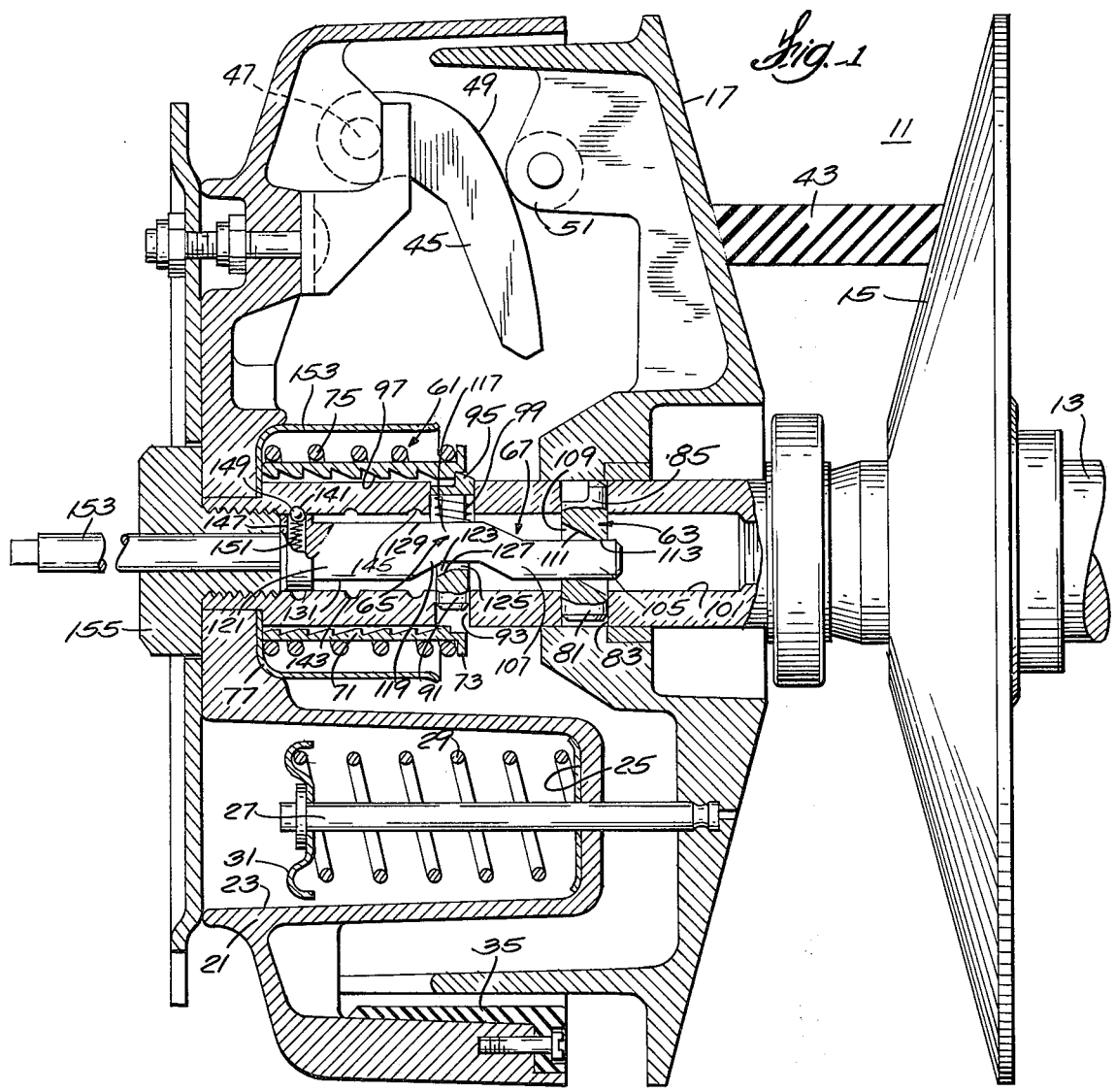
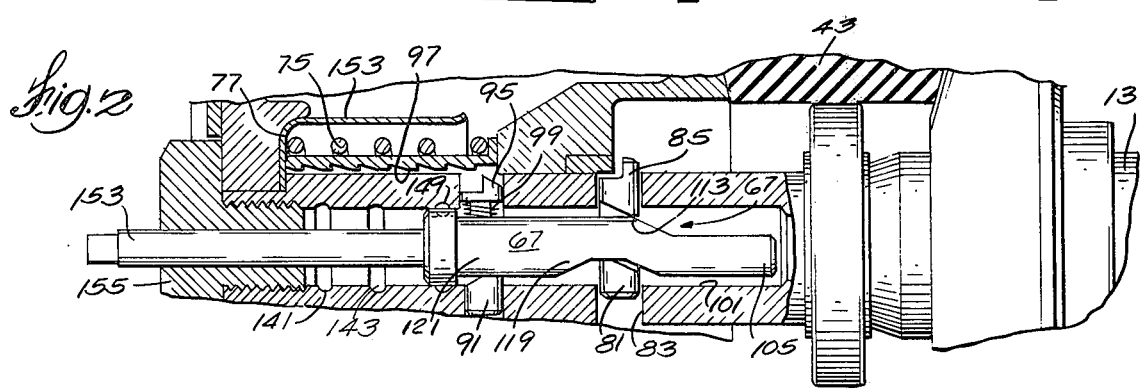
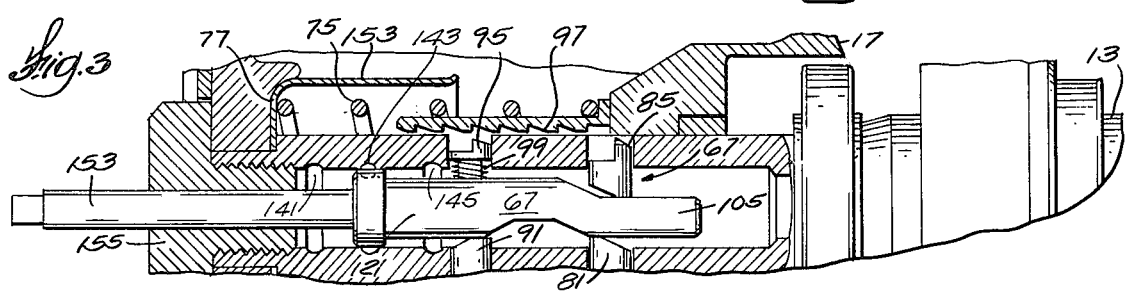

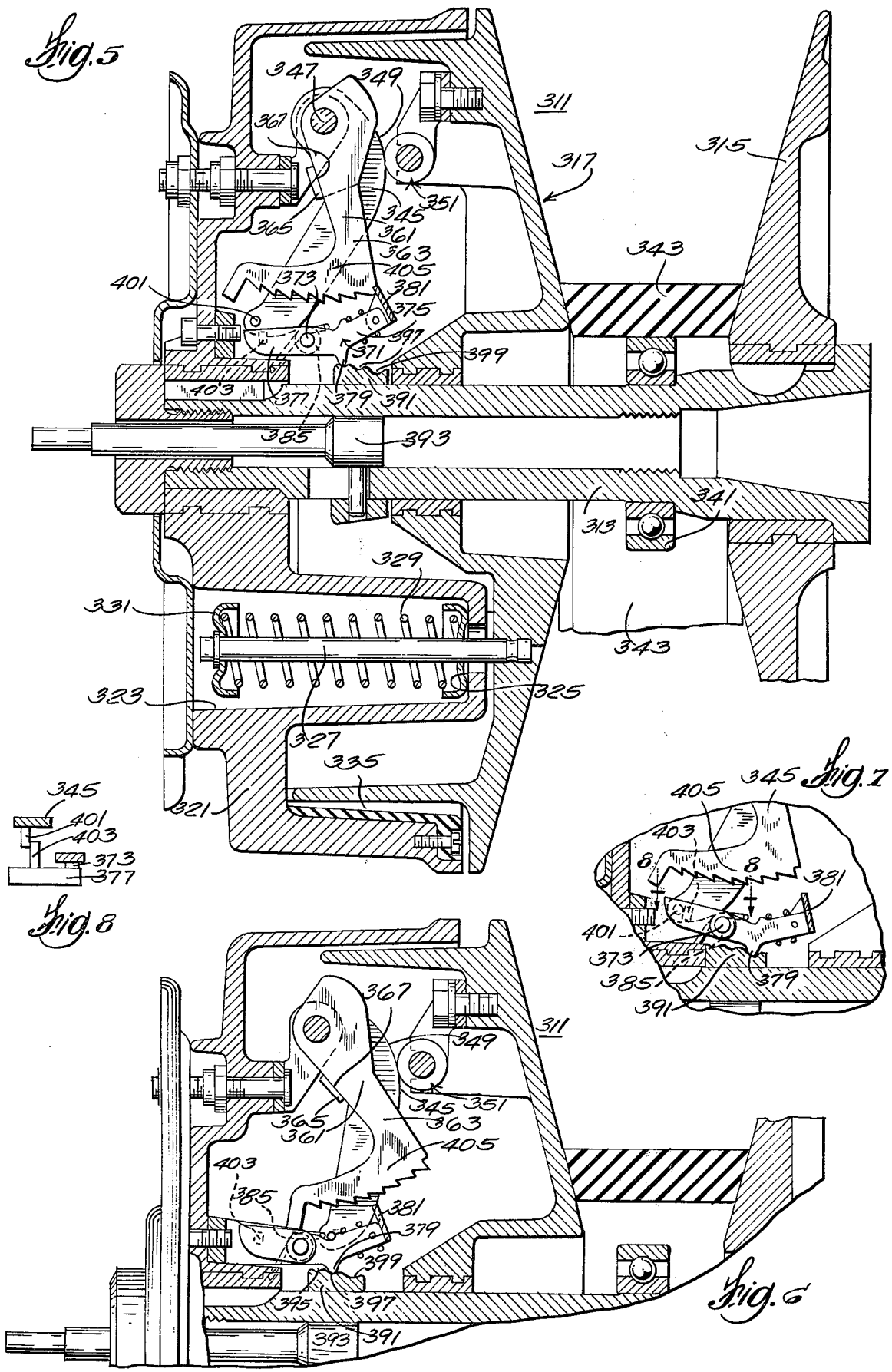

3,939,720

VARIABLE TRANSMISSION DRIVE PULLEY ASSEMBLY WITH SELECTIVE DRIVE

BACKGROUND OF THE INVENTION

The invention relates generally to variable transmission drive pulley assemblies, such as are used in snowmobiles.

Prior variable transmission drive pulley assemblies are disclosed in the following patents:

Watkins- U.S. Pat. No. 3,362,242 issued Jan. 9, 1968
Lassanske- U.S. Pat. No. 3,709,052 issued Jan. 9, 1973

SUMMARY OF THE INVENTION

The invention provides a variable transmission drive pulley assembly including a fixed sheave connected to a drive shaft for common rotation therewith, a movable sheave carried by the drive shaft for common rotation therewith and for movement axially thereof toward and away from the fixed sheave, and means urging the movable sheave away from the fixed sheave. In addition, the pulley assembly includes speed responsive means for displacing the movable sheave toward the fixed sheave, means for modifying the effectiveness of the speed responsive means, and selectively operable control means for controlling operation of the speed responsive means and the means for modifying the effectiveness of the speed responsive means.

In further accordance with the invention, the variable transmission drive pulley assembly is mounted in a snowmobile having a steering handle bar with a member movably mounted thereon remotely from the control means, together with a linkage connecting the member and the control means for actuation of the control means in response to movement of the member.

In accordance with the invention, the means for modifying the effectiveness of the speed responsive means can include means operatively engagable directly with the speed responsive means.

Also in accordance with the invention, the means for modifying the effectiveness of the speed responsive means can include additional means responsive to drive shaft rotation. Additionally in accordance with the invention, the means for modifying the effectiveness of the speed responsive means can include a member at least in part supporting the speed responsive means and mounted on the drive shaft for common rotation therewith and for movement axially thereof.

In accordance with the invention, the control means can include releasable means for preventing sheave displacing operation of the speed responsive means and/or a releasable means for preventing operation of the means for modifying the effectiveness of the speed responsive means.

Also in accordance with the invention, the releasable means for preventing sheave displacing operation by the speed responsive means can comprise releasable means interfering with movement of the movable sheave from the retracted position.

Also in accordance with the invention, the releasable means for preventing sheave displacing operation by the speed responsive means can comprise releasable means engagable with the speed responsive means for preventing operation thereof to displace the moveable sheave toward the fixed sheave.

In accordance with one embodiment of the invention, there is provided a variable transmission drive pulley assembly comprising a movable sheave carried by a drive shaft for common rotation therewith and for movement axially thereof toward and away from a fixed sheave connected to the drive shaft for common rotation therewith, together with means urging the movable sheave away from the fixed sheave, means for displacing the movable sheave toward the fixed sheave, releasable means for preventing movement of the movable sheave toward the fixed sheave, and selectively operable control means for controlling operation of the means for displacing the movable sheave toward the fixed sheave and the releasable means for preventing movement of the movable sheave toward the fixed sheave.

In further accordance with the invention, the pulley assembly can also include additional means responsive to drive shaft rotation for displacing the movable sheave toward the fixed sheave when the sheave movement preventing means is released.

Still further in accordance with the invention, the sheave displacing means mentioned in the second above paragraph can comprise a biasing spring and a member movable between positions spaced axially of the shaft, the sleeve being urged by the spring in the direction of movement of the movable sheave toward the fixed sheave.

Still further in accordance with the invention, the pulley assembly can include releasable means for preventing movement of the member between the two axially spaced positions, and the drive shaft can include therein an axial bore together with a first radial bore extending from the axial bore and a second radial bore extending from the axial bore in axially spaced relation to the first radial bore. In addition, the sheave movement preventing means can be located in the first radial bore and the member movement preventing means can be located in the second radial bore, and the control means can comprise a plunger in the bore movable between first, second and third positions and including first means engaging the sheave movement preventing means to displace the sheave movement preventing means radially outwardly into position for engagement with the movable sheave to prevent movement thereof toward the fixed sheave when the plunger is in the first position, together with second means on the plunger engaging the member movement preventing means to displace the member movement preventing means into position for engagement with the member to prevent movement thereof from one of the axially spaced positions toward the other of the axially spaced positions.

In accordance with another embodiment of the invention, there is provided a variable transmission drive pulley assembly including a fixed sheave connected to a drive shaft for common rotation therewith, a movable sheave carried by the drive shaft for common movement therewith and for movement axially thereof toward and away from the fixed sheave, and means urging the movable sheave away from the fixed sheave. In addition, the pulley assembly includes first or primary and second or secondary speed responsive means for displacing the movable sheave toward the fixed sheave, and selectively operable control means for controlling operation of the first and second means for displacing the movable sheave toward the fixed sheave.

In further accordance with the invention, the control means can be selectively operable to prevent the first and second speed responsive means from displacing the movable sheave toward the fixed sheave, to permit the first and second speed responsive means to displace the movable sheave toward the fixed sheave, and to permit displacement of the movable sheave toward the fixed sheave by the first speed responsive means, while preventing displacement of the movable sheave toward the fixed sheave by the second speed responsive means.

Still further in accordance with the invention, the control means can include an element movable between first, second, and third positions, together with means connecting the element and the first speed responsive means to prevent operation thereof to displace the movable sheave toward the fixed sheave when the element is in the first position, and means connecting the element and the second speed responsive means for preventing operation thereof to displace the movable sheave toward the fixed sheave when the element is in the third position.

In further accordance with the invention, the second speed responsive means can be engagable with the primary speed responsive means to assist the primary means in displacing the movable sheave toward the fixed sheave. More particularly, in one embodiment, the primary speed responsive means comprises a pivotally mounted first weight and the secondary speed responsive means comprises an assist weight pivotally mounted co-axially with the primary weight. Each of the primary weight and the secondary wieght include interengaging parts, whereby pivotal movement of the secondary weight in response to drive shaft rotation serves to engage the secondary weight against the primary weight in such a manner as to assist the action of the primary weight in displacing the movable sheave toward the fixed sheave.

In still further accordance with the invention, the control means can include a bore in the drive shaft together with a radial opening in the shaft communicating with the bore, and a plunger movable in the bore and including a part extending through the opening and connected to an actuator to displace the actuator axially of the drive shaft in response to movement of the plunger in the bore.

In accordance with still another embodiment of the invention, there is provided a variable transmission drive pulley assembly including a movable sheave carried by a drive shaft for common rotation therewith and for movement axially thereof from a retracted position remote from a fixed sheave mounted on the drive shaft for common rotation therewith, together with means urging the movable sheave toward the retracted position in the direction away from the fixed sheave. In addition, the variable transmission drive pulley assembly also includes a member or spider carried by the drive shaft for common rotation therewith and for movement axially thereof relative to a predetermined or "performance" drive position, together with means biasing the spider toward the "performance drive" position and in the direction toward the fixed sheave. Still further, the drive pulley assembly includes means carried by the movable sheave and the spider for displacing the movable sheave and the spider away from each other in response to drive shaft rotation, releasable means for preventing movement of the movable sheave from the retracted position in the direction toward the fixed sheave, releasable means for preventing movement of the spider from the predetermined or "performance drive" position in the direction away from the fixed sheave, and selectively operable means for actuating the releasable means so as to prevent movement of the movable sheave from the retracted position toward the fixed sheave, so as thereby to provide a "neutral" drive condition, to prevent movement of the spider from the predetermined or "performance drive" position in the direction away from the fixed sheave while permitting movement of the movable sheave from the retracted position in the direction toward the fixed sheave, so as thereby to provide a "performance drive" condition, and to permit movement of the movable sheave from the retracted position in the direction toward the fixed sheave while also permitting movement of the spider from the predetermined or "performance drive" position in the direction away from the fixed sheave so as to provide a "cruise" or "trail drive" condition.

In accordance with the invention, means can be provided for adjusting the extent of permissible movement of the spider in the direction from the "performance drive" position.

Also in accordance with the invention, the selectively operable actuating means can comprise an axial bore in the drive shaft, together with a plunger axially movable in the drive shaft, a movably mounted actuating lever located remotely from the plunger and adapted to be manually manipulated, and linkage means connecting the plunger and the lever to axially displace the plunger in accordance with manipulation of the lever.

Also in accordance with the invention, the releasable means in the third above paragraph can comprise axially spaced radial bores communicating with the axial bore, together with first and second elements respectively located in the first and second radial bores and respectively movable between inner retracted positions and outer interfering positions respectively interfering with movement of the movable sheave from the retracted position and with movement of the spider from the "performance drive" position. In this last regard, the plunger includes a plurality of lands cooperating with the elements to displace the elements radially outwardly to their interfering positions and to permit the elements to move radially inwardly to their retracted positions in accordance with the axial location of the plunger.

One of the principal features of the invention is the provision of a variable transmission drive pulley assembly which is adapted for use in a snowmobile and which provides for operation of the transmission in more than one mode.

Another of the principal features of the invention is the provision of a variable transmission drive pulley assembly which is particularly adapted for snowmobile usage and which provides a first or "neutral" condition, a second or "trail drive" condition particularly adapted for use during normal operation, and a third or "performance drive" condition which is particularly adapted to provide fast starts and for racing.

Another of the principal features of the invention is the provision of a snowmobile including a variable transmission drive pulley assembly, together with an operating lever located remotely from the pulley assembly, as for instance on the steering handle of the snowmobile.

Another of the principal features of the invention is the provision in a variable transmission drive pulley assembly of a selective drive mechanism in which there is provided means directly and releasably preventing movement of the movable sheave toward the fixed sheave.

Another of the principal features of the invention is the provision in a variable transmission drive pulley assembly of spring means for varying the effectiveness of the action of centrifugally actuated fly weights operable, in response to drive shaft rotation, to generate a force operable to displace the movable sheave toward a fixed sheave, together with provision of a control means selectively operable to permit variation by the spring means of the effectiveness of the rotation responsive force displacing the movable sheave toward the fixed sheave and to prevent variation by the spring means of the effectiveness of the rotation responsive force displacing the movable sheave toward the fixed sheave.

Another of the principal features of the invention is the provision of a variable transmission drive pulley assembly in which the movable sheave is displaced toward the fixed sheave by first and second means which are speed responsive and which are regulated by manually operable control means.

Another of the principal features of the invention is the provision of a variable transmission drive pulley assembly including an axially movable member or spider carrying one or more components of a means carried by the spider and by a movable sheave for displacing the movable sheave and the spider away from each other in response to drive shaft rotation, together with means biasing the spider in the direction toward a fixed sheave, and releasable means for preventing movement of the spider in the direction away from the fixed sheave.

Another of the principal features of the invention is the provision of a variable transmission drive pulley assembly which is economical to manufacture and which will provide reliable service over a long and useful life.

Other features and advantages of the invention will become known by reference to the following general description, claims, and appended drawings.

DRAWINGS

FIG. 1 is a fragmentary elevational view, partially in section, of one embodiment of a variable transmission drive pulley assembly embodying various of the features of the invention and illustrating the components in the "performance drive" condition.

FIG. 2 is a fragmentary view, partially in section, illustrating various of the components of the pulley assembly shown in FIG. 1 in the "neutral" condition.

FIG. 3 is a fragmentary view, partially in section, illustrating various of the components of the pulley assembly shown in FIG. 1 in the "trail drive" or "cruise" condition.

FIG. 5 is a fragmentary side elevational view, partially in section, of another embodiment of a variable transmission drive pulley assembly incorporating various of the features of the invention, and illustrating the components in the "performance drive" condition.

FIG. 6 is a fragmentary view similar to FIG. 5 showing the components of the pulley assembly of FIG. 5 in the "trail drive" or "cruise" condition.

FIG. 7 is another fragmentary view similar to FIG. 6 showing the components of the pulley assembly of FIG. 5 in the "neutral" condition.

FIG. 8 is a fragmentary view taken generally along the line 8—8 of FIG. 7.

Figure 4:
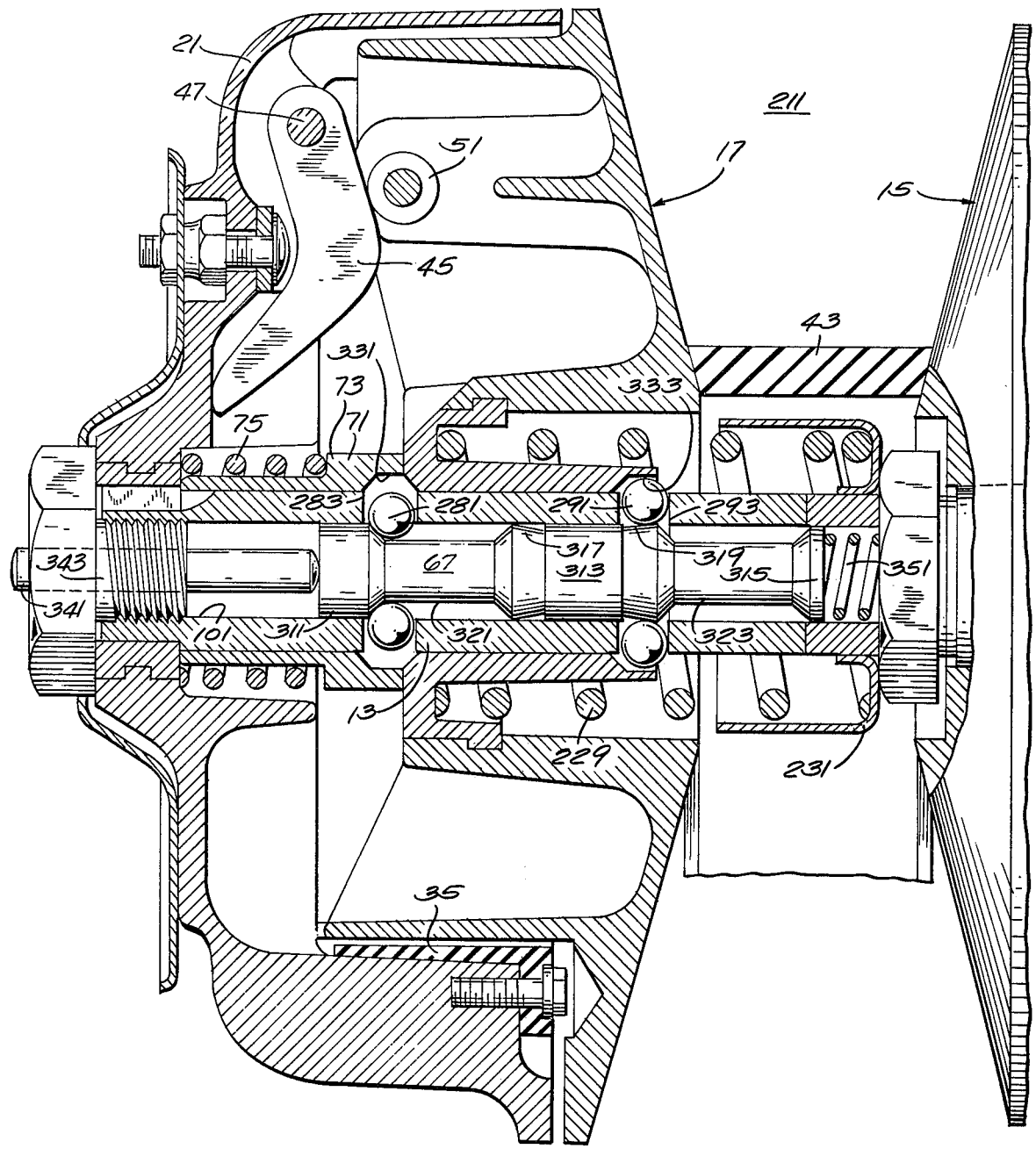
FIG. 4 is a fragmentary view, partially in section, of another embodiment of a variable transmission drive pulley assembly incorporating various of the features of the invention, and illustrating the components in the "neutral" condition.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also it is to be understood that the phraseology or terminology employed herein is for the purpose of description and not of limitation.

GENERAL DESCRIPTION

Shown in FIGS. 1 through 3 of the drawings is a variable speed transmission or sheave drive 11 which includes a primary or driving shaft 13 rotatably driven by a suitable power source (not shown). Carried on the driving shaft 13 is a sheave 15 which is fixed for common rotation with the driving shaft 13 and against movement axially of the driving shaft 13, together with a movable sheave 17 which is displaceable axially of the driving shaft 13 toward and away from the fixed sheave 15 between retracted and advanced positions, and which is also rotatable in common with the driving shaft 13.

Means are provided for biasing the movable sheave 17 away from the fixed sheave 15. Various arrangements can be employed. In the illustrated construction, such means comprises a cup 21 which is fixed to the drive shaft 13 for common rotation therewith and against axial movement relative thereto and which is formed to include three recesses 23 each having an apertured bottom wall 25 through which a stud 27 projects from the movable sheave 17. Telescopically mounted about each stud 27 is a spring 29 which, at one end, bears against the bottom wall 25 and which, at the other end, bears against a collar 31 fixed to the outer end of the stud 27. Thus the movable sheave 17 is biased by the springs 29 to the left as shown in FIG. 1 and away from the fixed sheave 15. As already indicated other arrangements could be employed for biasing the movable sheave 17 away from the fixed sheave 15. Various means can be provided for rotating the movable sheave 17 in common with the drive shaft 13. For instance, the movable sheave 17 could be keyed or mounted on a spline. In the illustrated construction, the movable sheave 17 is splined to the cup 21 adjacent the outer periphery thereof as shown at 35 in FIG. 1 and at a maximum distance from the shaft 13 in order to reduce force transmission therebetween.

Means operable in response to rotation of the drive shaft 13 are provided for displacing the movable sheave 17 toward the fixed sheave 15 such that the spacing between the sheaves 15 and 17 decreases as rotational speed increases so as thereby to drive a belt 43 at increasing speed. Various speed responsive means can be employed and, in the illustrated construction, such means comprises one or more eccentrically supported fly weights 45 (as shown at the top of FIG. 1) are mounted on pivots 47 on the cup 21, which are adapted to swing radially outwardly, i.e., to pivot in the counterclockwise direction in response to drive shaft rotation, and which include a camming part of surface 49 engageable with a reaction roller 51 on the movable sheave 17. Thus, when the drive shaft rotates, the fly weights 45 pivot in the counterclockwise direction, so as to displace the movable sheave 17 toward the fixed sheave 15, i.e., to the right in FIG. 1. The amount of movement of the movable sheave 17 toward the fixed sheave 15 is a function of the force exerted by the fly weights 45 against the reaction rollers 51 which, in turn, is a function of the mass of the fly weights 45 and of the speed of rotation thereof.

In accordance with the invention, means 61 are provided for modifying the effectiveness of the speed responsive means, i.e., by adding or subtracting to the force generated by the speed responsive means, or by preventing effective operation of the speed responsive means, together with selectively operable control means for controlling both the speed responsive means for displacing the movable sheave 17 toward the fixed sheave 15 and the means for modifying the effectiveness of the speed responsive means. In addition, the control means can be remotely actuated, as for instance, by a control element or lever mounted on the steering handle of a snowmobile.

In further accordance with the invention, the selectively operable control means is operable to prevent displacement of the movable sheave 17 toward the fixed sheave 15 by the rotating fly weights 45 regardless of drive shaft rotation, so as thereby to provide a "neutral" condition, to permit modification of the force generated by the speed responsive means so as thereby to cause displacement of the movable sheave 17 toward the fixed sheave 15 and to consequnetly initiate driving engagement of the drive belt 43 at one rate of drive shaft rotation, and to prevent modification of the force generated by the rotating fly weights 45 so as thereby to initiate driving engagement of the belt at a different rate of rotation.

Various arrangements can be employed to modify the effectiveness of the speed responsive means. For instance, means can be provided for selectively operably engaging the movable sheave 17 independently of the speed responsive means to apply to the movable sheave 17 a modifying force which can either be additive to or subtrative from the movable sheave displacing force applied by the rotating fly weights 45.

Such modifying force can be provided by spring means, or by hydraulic or pneumatic means, or by magnetic means, or by means responsive to attempted torque transmission. When the modifying force is torque responsive, the movable sheave is mounted on the drive shaft 13 for limited relative rotation therebetween, i.e., less than about 180°, but otherwise has rotation with the drive shaft. Such mounting affording limited relative rotation is encompassed by reference in the claims to "common" rotative movement of the movable sheave with the drive shaft.

The means for modifying the effectiveness of the speed responsive means to displace the movable sheave 17 toward the fixed sheave 15 can also include means directly operatively engagable with the speed responsive means to affect the effectiveness thereof. For instance, the mounting of at least one of the components of the speed responsive means can be selectively movably located. Alternatively, additional speed responsive means such as assists fly weights (as distinguished from the before mentioned or primary fly weights 45) can be employed. Further alternatively, one or more of the primary fly weights 45 can be selectively rendered inoperable. Still further alternatively, such selective employment of speed responsive weights can involve selective use of weights having differing mass or having camming surfaces with differing cam configurations. Still further alternatively, spring means can be selectively applied to the speed responsive means to vary the net force available to displace the movable sheave 17 for a given rate of drive shaft rotation. Such modification fo the force applied to the movable sheave 17 for displacement thereof toward the fixed sheave 15 can be either an additive or positive modification or a negative or subtractive modification.

The arrangements for applying a modifying force to the movable sheave independently of the speed responsive means or for modifying the net force generated by the speed responsive means and available for application to the movable sheave 17, can be used singularly or in combination.

Various control means can be employed. For instance, displacement of the movable sheave 17 by the speed responsive means can be controlled by directly preventing movement of the movable sheave 17 or by rendering the speed responsive means inoperable. In addition, means can be employed to control the means for modifying the effectiveness of the speed responsive means by directly operably effecting the modifying means or by affecting the modifying means through the speed responsive means.

It is to be understood that the various disclosed embodiments are only illustrative of some forms of the invention and that the invention extends beyond the specifically illustrated means for modifying the effectiveness of the speed responsive means and beyond the specifically illustrated control means.

While various other arrangements could be employed, in the construction shown in FIGS. 1 through 3, the modifying means 61 for displacing the movable sheave 17 toward the fixed sheave 15 comprises a sleeve 71 located in telescopic relation to the drive shaft 13 and including, at the end thereof adjacent to the movable sheave 17, a circular flange. The sleeve 71 is movable between a retracted position shown in FIGS. 1 and 2 and an advanced position shown in FIG. 3. The modifying means 61 for displacing the movable sheave 17 toward the fixed sheave 17 also includes a helical spring 75 which is located in encircling relation to the sleeve 71 and which is seated, at one end, against the circular flange 73 and, at the other end, is seated against a part 77 of the fixed cup 23. Thus, the spring 75 urges the sleeve 71 toward the advanced position, i.e., to the right in the drawings so as to apply additional force to the movable sheave 17. When the drive shaft 13 is not rotating, the bias of the main springs 29 overpowers the spring 75 so as to automatically displace the sleeve 71 toward the left in the drawings, i.e., to the retracted position shown in FIGS. 1 and 2.

While various other arrangements could be employed, in the construction shown in FIGS. 1 through 3, the control means includes releasable means 63 for preventing movement of the movable sheave 17 toward the fixed sheave 15, and releasable means 65 for preventing sheave displacing operation of the modifying means 61. In addition, there is provided a selectively operable actuator 67 for affecting operation of the sheave movement preventing means 63 and for affecting operation of the releasable means 65 for preventing sheave displacing operation of the modifying means 61.

While various arrangements can be employed, in the construction shown in FIGS. 1 through 3, the sheave movement preventing means 63 comprises an element or member 81 in a bore 83 extending radially of the drive shaft 13 between a retracted position (See FIGS. 1 and 3), and an advanced or extended position (See FIG. 2) in which an outer end portion 85 extends into position for engagement with the movable sheave 17 to prevent movement of the sheave 17 from its retracted position toward the fixed sheave 15 and thereby provides a "neutral" condition.

While various other arrangements can be employed in the construction shown in FIGS. 1 through 3, the releasable means 65 for preventing sleeve displacement serves to prevent movement of the sleeve 71 toward the advanced position and comprises an element or member 91 which is located in a radial bore 93 in the drive shaft 13 and which includes an outer tang 95 selectively engagable with an axially extending series of serrations 97 on the inside surface of the sleeve 71. The sleeve movement preventing member 91 is biased from a retracted position shown in FIGS. 2 and 3 by means in the form of a spring 99 to an extended position shown in FIG. 1 in which the tang 95 is engagable with one of the serrations 97 to prevent sleeve movement to the right.

While other arrangements could be employed, in the construction shown in FIGS. 1 through 3, the control means includes an axial bore 101 extending in the drive shaft 13 and communicating with each of the radial bores 83 and 93. Located in the axial bore 101 is the actuator or plunger 67 which is movable axially between first, second and third positions corresponding respectively to "neutral", "trail drive" and "performance drive" positions. Included on the actuator or plunger 67 and on the sheave movement preventing member 81 are means for displacing the member 81 between its retracted and advanced positions in accordance with the position of the actuator or plunger 67. Thus the actuator 67 includes a straight inner terminal portion 105 followed by an inclined portion 107, both of which cooperate with an opening 109 located in the member 81 and having inclined and straight wall means 111 and 113 respectively so that when the actuator 67 is in the "performance drive" and "trail drive" positions (FIGS. 1 and 3) the member 81 is controlled by the straight terminal portion 105 to maintain the member 81 in the retracted position and when the actuator 67 is in the "neutral" position shown in FIG. 2, the sheave movement preventing member 81 is engaged by the inclined portion 107 of the actuator 103 to displace the sheave movement preventing member 81 to its advanced or extended position in engagement with the movable sheave 17 to prevent displacement of the movable sheave 17 toward the right and toward the fixed sheave 15.

Also included on the actuator or plunger 67 and on the sleeve movement preventing member 91 are means for controlling the position of the sleeve movement preventing member 91 in accordance with the position of the actuator 67. Thus, the actuator 67 includes, adjacent to the inclined portion 107, a neck portion 117, and adjacent to the neck portion 117, a second inclined portion 119 followed by a straight portion 121. Formed in the sleeve movement preventing member 91 is an opening 123 through which the actuator 67 extends and which is defined, in part, by a lower horizontal or straight wall 125 and a lower inclined wall 127.

The beforementioned biasing spring 99 is engaged between the top portion or tang 95 of the sleeve movement preventing member 91 and the upper straight surface or edge 129 of the actuator 67. The actuator portion 121, the spring 99, and the opening 123 in the sleeve movement preventing member 91 are arranged such that when the actuator 67 is in the "neutral" position (See FIG. 2) and in the "trail drive" position (See FIG. 3) the straight lower edge surface 131 of the actuator 67 engages the lower horizontal wall 125 of the opening 123 to retain the sleeve movement preventing member 91 in the retracted position against the action of the spring 99. However, when the actuator 67 is moved to the "performance drive" position, the neck portion 117 of the actuator 67 moves into the opening 123 in the sleeve movement preventing member 91 and permits the spring 99 to extend the sleeve movement preventing member 91 to the advanced position preventing movement of the sleeve 71 to the right (See FIG. 1).

Detent means are provided for yieldably retaining the actuator or plunger 67 in one of the "neutral", "trail drive" or "performance drive" positions. While various arrangements could be employed, in the construction illustrated in FIGS. 1 through 3, such means comprises three axially spaced recesses 141, 143 and 145 included in the wall of the axial bore 101, together with a radial bore 147 in the actuator 67 housing a ball 149 biased outwardly toward the recesses 141, 143 and 145 by a spring 151.

Extending at the left end of the actuator or plunger 67 is an actuating rod 153 which passes through a plug 155 closing the axial bore 101 in the drive shaft 13.

In addition, a guard 153 extends in outward telescopic relation to the spring 75.

In operation, when the actuator or plunger 67 is in the "neutral" position shown in FIG. 2, the sheave movement preventing member 81 is in the advanced position preventing movement of the movable sheave 17 toward the fixed sheave 15 regardless of the rate of rotation of the drive shaft 13 or the axial force applied to the movable sheave 17 by the centrifugal fly weights 45. At the same time, the sleeve movement preventing member 91 is held in its retracted position.

Upon movement of the actuator 67 from the "neutral" position to the "trail drive" position, the sheave movement preventing member 81 is withdrawn from its advanced position to its retracted position and the sleeve movement preventing member 91 is maintained in the retracted position. Accordingly, movement of the sleeve 71 toward the advanced position is permitted, thereby applying to the movable sheave 17 an additional or modifying force in addition to the force applied by the centrifugal fly weights 45, tending to displace the movable sheave 17 toward the fixed sheave 15. Accordingly, the movable sheave 17 will initiate movement to the right in response to a lower rotational speed of the drive shaft 13 then would be the case if the spring 75 were omitted.

In the event that the actuator 67 is moved from the "trail drive" position to the "performance drive" position, the sheave movement preventing member 81 is retained in retracted position and the sleeve movement preventing member 91 is permitted to move from its retracted position to its advanced position under the influence of the spring 99. The sleeve movement preventing member 91 will, therefore, move into position preventing further movement of the sleeve 71 to the right but permitting movement of the sleeve 71 to the left in response to decreasing drive shaft rotation. With the sleeve 71 prevented from moving to the right, a greater rotational speed is required to initiate displacement of the movable sheave 17 toward the fixed sheave 15.

Movement of the actuator 67 from the "performance drive" position to the "trail drive" position effects movement of the sleeve movement preventing member 91 to the retracted position while the sheave movement preventing member 81 is retained in its retracted position. Further movement of the actuator 103 from the "trail drive" position to the "neutral" position serves to retain the sleeve movement preventing member 91 in the retracted position, while the sheave movement preventing member 81 is displaced to the advanced position preventing displacement of the movable sheave 17 toward the fixed sheave 15 regardless of the rate of rotation of the drive shaft 13.

Shown in FIG. 4 is another embodiment of a variable transmission drive pulley assembly 211 which is constructed in generally the same manner as is the construction illustrated in FIGS. 1, 2 and 3 except as noted hereafter. Accordingly, reference characters corresponding to the reference characters applied to the components illustrated in FIGS. 1, 2 and 3 have been applied to the comparable components in the construction shown in FIG. 4.

In the construction shown in FIG. 4, the movable sheave 17 is biased away from the fixed sheave 15 by spring means 229 bearing, at one end, in a cup 231 located adjacent to the fixed sheave 15 and fixed for rotation with the drive shaft 13. The cup 231 extends between the spring means 229 and the drive belt 43. In the construction shown in FIG. 4, the sleeve movement preventing means and the sheave movement preventing means comprise one or more respective balls 281 and 291 housed in respective axially spaced radial slots 283 and 293 in the drive shaft 13 and movable between inner retracted positions and outer extended or advanced positions by a plunger or actuator 67 movable between "neutral", "trail drive" and "performance drive" positions in like manner to the movement of the actuator 103 disclosed in the FIGS. 1 through 3 embodiment.

The plunger 67 includes three axially spaced cylindrical portions or lands 311, 313 and 315 which engage the walls of the bore 101 together with two portions 317 and 319 which are respectively located on opposite sides of the central land 313 and have outer surfaces which are slightly inclined toward the central land 313, and two portions 321 and 323 of reduced diameter which extend to either side of the two inclined outer surface portions 317 and 319 and which permit movement of the associated balls 281 and 291 to their retracted positions. The portions 317 and 319 with the inclined surfaces serve to locate the associated balls 281 and 291 radially outwardly so as to prevent movement of the sheave 17 and sleeve 71 to the right as shown in FIG. 4. Use of the inclined surfaces also serves to provide releasable detent means for the "trail drive" and "neutral" positions.

At their right ends, the sleeve 71 and movable sheave 17 include respective counter bored portions 331 and 333 permitting partial entry there into of the balls 281 and 291 to prevent sleeve and sheave movement while also preventing loss of the balls 291 and 281 from the radial bores 293 and 283 in the drive shaft 13.

Extending from the left end of the plunger 67 is an actuating rod 341 which passes through a plug 343 closing the axial bore 101 in the drive shaft 13.

Also included in the construction shown in FIG. 4 is means for biasing the plunger 67 outwardly of the bore 101 and toward the "performance drive" position. While other means could be employed, in the construction illustrated in FIG. 4, such means comprises a helical spring 351 engaged against the right end of the plunger 67 and against the blind end of the bore 101.

The operation of the construction shown in FIG. 4 is essentially similar to the construction shown in FIGS. 1 through 3 and accordingly, a detailed description of the operation is believed to be unnecessary. Suffice to say, movement of the plunger 103 between the "neutral", "trail drive", and "performance drive" positions serves to locate the balls 281 and 291 so as to selectively prevent and permit movement of the movable sheave 17 and sleeve 71 as already explained.

Shown in FIGS. 5 through 8 of the drawings is another embodiment of a variable speed transmission or sheave drive 311 which includes a primary or drive shaft 313 rotatably driven by a suitable power source (not shown). Carried on the drive shaft 313 is a sheave 315 which is fixed for common rotation with the drive shaft 313 and against movement axially of the drive shaft 313, together with a movable sheave 317 which is displaceable axially of the drive shaft 313 toward and away from the fixed sheave 315 and which is also rotatable in common with the driving shaft 313.

Means are also provided for biasing the movable sheave 317 away from the fixed sheave 315. Various arrangements can be employed. In the illustrated construction, such means comprises a cup 321 which is fixed to the drive shaft 313 for common rotation therewith and against axial movement relative thereto and which is formed to include one or more recesses 323 (three in the illustrated construction) each having an apertured bottom wall 325 through which a stud 327 projects from the movable sheave 317. Telescopically mounted about each stud 327 is a spring 329 which, at one end, bears against the bottom wall 325 and which, at the other end, bears against a collar 331 fixed to the outer end of the stud 327. Thus, the movable sheave 317 is biased by the springs 329 to the left as shown in FIG. 5 and away from the fixed sheave 315. As already indicated other arrangements could be employed for biasing the movable sheave 317 away from the fixed sheave 315.

Various means can be provided for rotating the movable sheave 317 in common with the drive shaft 313. For instance, the movable sheave 317 could be keyed or mounted on a spline. In the illustrated construction, the movable sheave 317 is splined to the cup 321 adjacent the outer periphery thereof as shown at 335 in FIG. 5 and at a maximum distance from the shaft 313 in order to reduce force transmission therebetween.

Also carried by the driving shaft 313 is an idler bearing 341 located between the fixed and movable sheaves 315 and 317 and adapted to be engaged by a drive belt 343 when the movable sheave 317 is located most remotely from the fixed sheave 315.

Means are provided for displacing the movable sheave 317 toward the fixed sheave 315 in response to rotation of the driving shaft 313 such that the spacing between the sheaves 315 and 317 decreases as rotational speed increases. Various means can be employed, in the illustrated construction, such means comprises one or more eccentrically supported fly weights 345 (three in the illustrated construction) which (as shown at the top of FIG. 5) are mounted on pivots 347 on the cup 321, which are adapted to swing radially outwardly, i.e., to pivot in the counterclockwise direction as shown in FIGS. 5 through 8 in response to the drive shaft rotation, and which include a camming part or surface 349 engageable with a reaction roller 351 on the movable sheave 317. Thus, when the drive shaft rotates, the fly weights 345 pivot in the counterclockwise direction, so as to displace the movable sheave 317 toward the fixed sheave 315, i.e., to the right in FIG. 5. The amount of movement of the movable sheave 317 toward the fixed sheave 315 is a function of the force exerted by the fly weights 345 against the reaction rollers 351 which, in turn, is a function of the mass of the fly weights 345 and of the speed of rotation thereof.

In accordance with the invention, the pulley assembly 311 includes means for providing a force modifying the effectiveness of the force generated by the rotating fly weights 345 for displacing the movable sheave 317 toward the fixed sheave 315, together with selectively operable control means for preventing displacement of the movable sheave 317 toward the fixed sheave 315 regardless of drive shaft rotation, so as thereby to provide a "neutral" condition, for permitting augmentation of the force generated by the rotating fly weights 345 so as thereby to cause displacement of the movable sheave 317 toward the fixed sheave 315 and consequent driving engagement of the drive belt 343 at a lower rate of drive shaft rotation than possible only by reason of the force generated by the rotating fly weights and so as thereby to produce a "trail drive" condition, and for preventing augmentation of the force generated by the rotating fly weights 345 so as thereby to make driving engagement of the belt dependent only on the force generated by the rotating fly weights 345 and so as thereby to cause belt driving engagement only in response to a relatively high rate of rotation of the drive shaft 313 and thereby to provide a "performance drive" condition.

As already pointed out, various means can be employed to provide a force modifying the force generated by the rotating fly weights 345. In the construction shown in FIGS. 5 through 8, the modifying means generates a force which assists or augments the force generated by the fly weights 345 and which operates in opposition to the force of the spring 329 biasing the movable sheave 317 away from the fixed sheave. More particularly, the modifying means comprises one or more pivotally mounted assist weights 361 (preferably three) which are pivotally mounted co-axially with the fly weights 345 and which include an extending portion 363 and are adapted to engage a part 367 of the co-axially mounted fly weight 345 so as to increase the force tending to displace the fly weights 345 in the counter clockwise direction. Thus, in response to drive shaft rotation, the assist weights 361 pivot in the counterclockwise direction and the force generated thereby is applied by the arm 365 to the fly weights 345 and through the fly weights 345 to the movable sheave 317 so as thereby to increase the force applied to the movable sheave 317 at any given rate of rotation, whereby to displace the movable sheave 317 toward the fixed sheave 315 with a greater force at any given rate of rotation and thereby to displace the movable sheave 317 toward the fixed sheave 315 a greater distance at a given rate of rotation than is possible by means of weights 345 acting alone.

While other means could be employed, the selectively operable control means, illustrated in FIGS. 5 through 8, includes means for controlling the operability of the fly weights 345 and assist weights 361 to provide the desired "neutral" condition, the "trail drive" condition, and the "performance drive" condition. Various arrangements can be provided. In the illustrated construction, there is provided for each pair of co-axially mounted fly weights 345 and assist weights 361, an actuating member or arm 371 which is mounted for movement between first, second and third positions, corresponding respectively to "neutral", "trail drive" and "performance drive" settings. While other mounting arrangements could be employed, the arm 371 is pivotally mounted on a pivot shaft 373 extending from the cup 321 and includes end portions 375 and 377 which extend in opposite directions from the pivot shaft 373 with the end portion 375 including a depending tang 379 and having, at its outer end, a dog 381.

Means are provided for releasably urging the arm 371 in the clockwise direction as seen in FIGS. 5 through 8, i.e., toward the "neutral" position. While various arrangements can be employed, in the illustrated construction, such means comprises a spring 385 which is suitably anchored in the cup 321 and which engages the upper edge of the end portion 375 of the arm 371 to the right of the pivot shaft 373 so as to urge the actuating member or arm 371 in the clockwise direction about the pivot shaft 373.

Movement of the actuating member or arm 371 under the bias of the spring 385 is controlled by a movable member 391 which, in turn, is controlled by an element 393 which is also movable between first, second and third positions corresponding respectively to "neutral", "trail drive" and "performance drive" settings. While various constructions can be employed, the member 391 includes three serially arranged detents or recesses 395, 397, 399 which selectively receive the tang 379 to determine the position of the actuating member or arm 371. While other arrangements could be employed, in the illustrated construction the member 391 is in the form of a sleeve or ring which is axially movable on the drive shaft 313 and which has rotation in common therewith. The detents 395, 397 and 399 are spaced axially of the drive shaft 313 and located at differing radial distances from the drive shaft axis with the "trail drive" detent 397 being located radially intermediate the "neutral" and "performance drive" detents 395 and 399. Accordingly, depending upon the axial location of the sleeve or ring 391, the arm 371 will be in one of three positions, i.e., the "neutral", "trail drive" or "performance drive" position.

Means are provided on the actuating member or arm 371 for preventing displacement of the movable sheave 317 toward the fixed sheave 315 when the actuating member or arm 371 is in the "neutral" position (See FIG. 7) and for preventing operation of the assist weights 361 from assisting displacement of the movable sheave 317 toward the fixed sheave 315 when the actuating member or arm 371 is in the "performance drive" position (See FIG. 5). In the "trail drive" position of the actuating member or arm 371 (See FIG. 6), both the fly weights 345 and the assist weights 361 are operable to displace the movable sheave 317 toward the fixed sheave 315 against the action of the springs 329.

While various arrangements can be provided for preventing displacement of the movable sheave 317 toward the fixed sheave 315 when the actuating member or arm 371 is in the "neutral" position, in the illustrated construction interengaging means are provided on the arm 371 and on the fly weights 345 to prevent radially outward fly weight movement notwithstanding rotation of the drive shaft 313. Specifically, such means comprises a pin 401 which extends from the weight 345 parallel to the axis of the pivot 347, which is located to pass clear of the left end portion 377 of the actuating member or arm 371 when the arm 371 is in the "trail drive" and "performance drive" positions, and which is located to be blocked by a block or stop 403 at the left end portion 377 of the actuating member or arm 371 when the member or arm 371 is in the first or "neutral" position, thereby preventing outward movement of the fly weights 345 so as thereby to prevent displacement of the movable sheave 317 toward the fixed sheave 315 against the action of the springs 329.

Various arrangements can be provided for preventing operation of the assist weights 361 when the actuating member or arm 371 is in the third or "performance drive" position. In the illustrated construction, such means comprises (See FIG. 5) the before mentioned dog 381 which extends from the outermost end of the right end portion 375 of the arm 371 into a position to block movement of an end part 405 of the assist weight 361 when the actuating member or arm 371 is in the third or "performance drive" position. When the actuating member or arm 371 is in the "neutral" or "trail drive" position, the dog 381 is withdrawn to a position clear of the pivotal path of the end part 465 of the assist weight 361. However, when the actuating member or arm 371 is in the first or "neutral" position, as already indicated, the fly weights 345 are prevented from moving radially outwardly which, in turn, also prevents the assist weights 361 from moving radially outwardly. When the actuating member or arm 371 is in the second or "trail drive" position, both the fly weights 345 and the assist weights 361 are free to pivot radially outwardly in response to rotation of the drive shaft 313 and thereby to cause displacement of the movable sheave 317 towards the fixed sheave 315 against the action of the springs 329 at a relatively low speed as compared to the rotational speed which is operative to displace the movable sheave 317 toward the fixed sheave 315 when the actuating member or arm is in the third or "performance drive" position.

From the foregoing, it is believed to be clear that axial movement of the plunger 393 serves to locate the actuator or arm 371 so as to either prevent radially outward swinging movement of the fly weights 345 by reason of blocking engagement between the stops 403 and the pins 401 when the plunger 393 and arm 371 are in the "neutral" position shown in FIG. 7 (and thereby to also block radially outward swinging movement of the assist weights 361), to permit radially outward swinging movement of both the fly weights 345 and the assist weights 361 when the plunger 393 and arm 371 are in the "trail drive" or "cruise" position shown in FIG. 6, and to prevent radially outward swinging movement of the assist weights 361 by reason of engagement of the dogs 381 therewith when the plunger 393 and arm 371 are in the "performance drive" position shown in FIG. 5.

Figure 9:
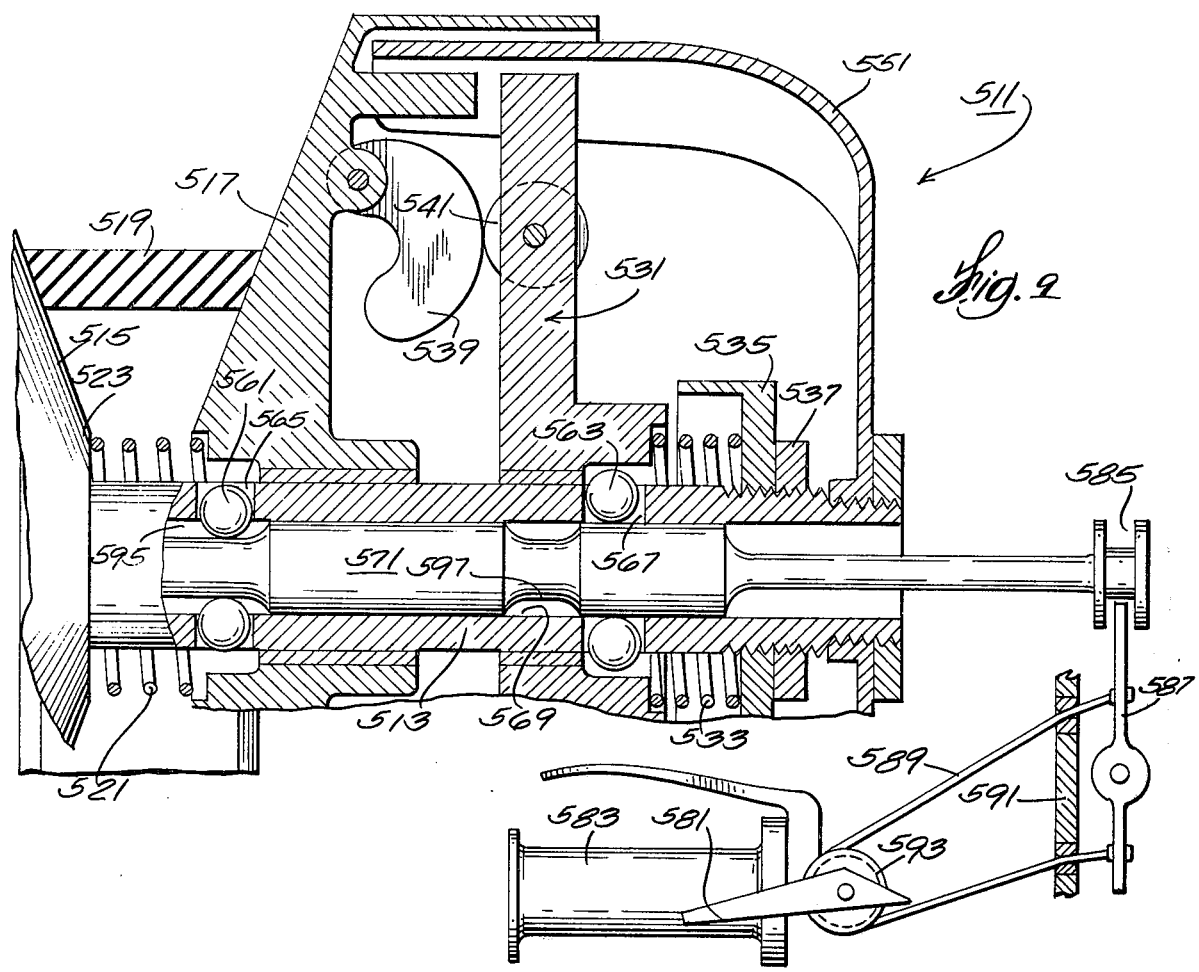
FIG. 9 is a fragmentary view, partially broken away and in section, of another embodiment of a variable transmission drive pulley assembly incorporating various of the features of the invention, and illustrating the components in the "performance drive" condition.
Figure 10:
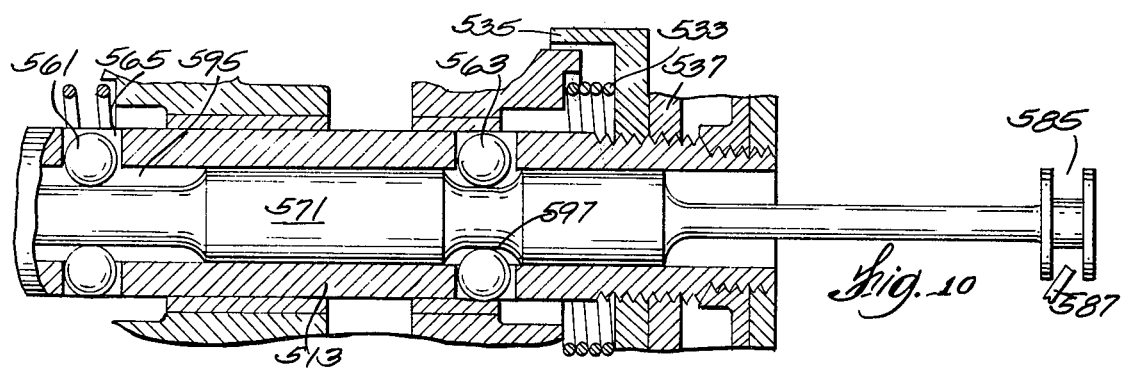
FIG. 10 is a fragmentary view, partially in section, of various of the components shown in FIG. 9 in the "trail drive" or "cruise" condition.
Figure 11:
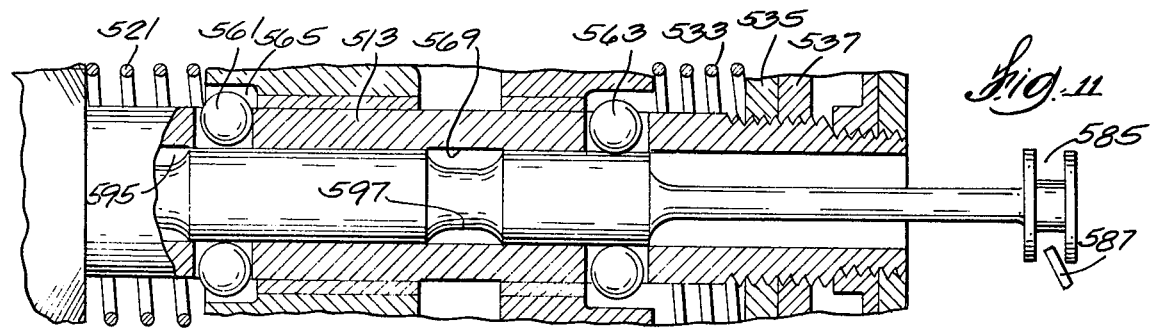
FIG. 11 is a fragmentary view, partially in section, of various of the components shown in FIG. 9 in the "neutral" condition.

Illustrated in FIGS. 9 through 11 of the drawings is another embodiment of a variable transmission drive pulley assembly 511 including a drive shaft 513 which is suitably supported for rotation and connected to a suitable source of power (not shown).

Fixed on the drive shaft 513 for common rotation therewith is a fixed pulley sheave 515.

Carried by the drive shaft 513 and in facing relation to the fixed sheave 515 for common rotation with the drive shaft 513 and for axial movement relative thereto is a movable sheave 517. The movable sheave 517 is movable from a retracted position spaced from the fixed sheave 515 and clear of a drive belt 519 and toward the fixed sheave 515 for engagement with the drive belt 519 at varying diameters according to the rate of drive shaft rotation and the amount of attempted torque transmission.

Means are provided for biasing the movable sheave 517 toward the retracted position and away from the fixed sheave 515. While various other arrangements could be employed, in the illustrated construction, such means comprises a helical spring 521 located in surrounding relation to the drive shaft 513 and engaged, at one end, with the movable sheave 517 and, at the other end, with a part 523 of the assembly 511 fixed with respect to the drive shaft 513 and sheave 515.

In accordance with the invention, means are provided for modifying the effectiveness of the speed responsive means still to be described. In the construction illustrated in FIGS. 9 through 11, such means directly modifies the action of the speed responsive means and comprises a member or spider 531 carried by the drive shaft 513 for common rotation therewith and for axial movement relative thereto. The spider 531 is movable from a predetermined or "performance drive" position (See FIG. 9) in the direction away from the fixed sheave 515 to a "trail drive" or "cruise" position (See FIG. 10).

Means are provided for biasing the movable member or spider 531 toward the predetermined or "performance drive" position in the direction toward the fixed sheave 515. While various arrangements could be employed, in the illustrated construction, such means comprises a helical spring 533 located in surrounding relation to the drive shaft 513 and bearing, at one end, against the movable member 531, and bearing at the other end, against a combination stop and spring retainer 535 which is threaded on the drive shaft 513 and releasably locked on the drive shaft 513 for common rotative movement therewith in axially adjustable position by a nut 537 so as thereby to determine the "trail drive" or "cruise" position (See FIG. 10) by limiting movement of the spider 531 away from the "performance drive" position (See FIG. 9). Means are provided for displacing the movable sheave 517 toward the fixed sheave 515 in response to drive shaft rotation. While various other arrangements can be employed, in the illustrated construction, such means includes one or more pivotally mounted fly weights 539 and associated reaction rollers 541. In the illustrated construction, the fly weights 539 are mounted on the movable sheave 517 and the reaction rollers 541 are mounted on the spider 531. However, the fly weights 539 could be mounted on the spider 531 and the reaction rollers 541 could be mounted on the movable sheave 517. Thus, when the drive shaft 513 is at rest, engagement of the rollers 541 against the fly weights 539 (when in their radially innermost positions) under the action of the spring 533 fixes the predetermined or "performance" position of the spider 531 relative to the drive shaft 513.

Also included in the illustrated construction is a bell-shaped guard 551 which is fixed to the drive shaft 513 and which is telescopically arranged with respect to the movable sheave 517.

In further accordance with the invention, control means are provided, including releasable means for preventing movement of the sheave 517 from the retracted position in the direction toward the fixed sheave 515 and releasable means for preventing movement of the spider 531 from the predetermined or "performance drive" position (See FIG. 9) in the direction away from the fixed sheave 515, together with selectively operable means for actuating the releasable means so as to prevent movement of the movable sheave 517 from the retracted position toward the fixed sheave 515 and thereby to provide a "neutral" condition, to prevent movement of the member or spider 31 from the "performance drive" position in the direction away from the fixed sheave 515, while permitting movement of the sheave 517 from the retracted position in the direction toward the fixed sheave 515 so as thereby to provide the "performance drive" condition, and to permit movement of the sheave 517 from the retracted position in the direction toward the fixed sheave 513 while also permitting movement of the spider 531 from the predetermined or "performance drive" position in the direction away from the fixed sheave 513 against the action of the spring 533 and so as thereby to provide a "trail drive" or "cruise drive" condition. In this regard, it is noted that the bias of the spring 533 is less than that of the spring 521 so that, upon initial drive shaft rotation, the spring 533 will collapse before the spring 521 provided the spider 531 is permitted to move to the right from the "performance drive" position.

More specifically, the releasable means controlling movement of the sheave 517 and spider 531 comprise respective balls 561 and 563 located in respective axially spaced bores 565 and 567 communicating with an axial bore 569 in the drive shaft 513. The balls 561 and 563 are respectively displaceable outwardly into positions interfering with movement of the sheave 517 and the spider 531 by an actuator or plunger 571 which is movable axially in the bore 569. The plunger 571 includes a plurality of lands or portions which, incident to selective axial positioning of the plunger 571 in the bore 569, displace the balls 561 and 563 to the interfering positions or permit the balls 561 and 563 to move into retracted positions clear of interference with movement of the sheave 517 and the spider 531.

Various means located remotely from the activator or plunger 571 can be employed to axially shift the activator or plunger 571. In the illustrated construction which is particularly adapted for use on a snowmobile, such means includes a lever 581 pivotally mounted on a steering handle 583 and connected to the plunger 571 by linkage means which displaces the plunger 571 in accordance with displacement of the lever 581. While other arrangements can readily be employed, in the illustrated construction, the outer end of the plunger 571 is provided with an annular groove 585 which receives one end of a centrally mounted pivot arm 587. Connected to the pivot arm 587 on each side of the central pivot is a flexible cable 589 which is guided for movement through a support 591 and trained around and fixed to a pulley 593 mounted concentrically with the lever 581 for common rotary movement therewith. Of course, the remote plunger shifting means can also be used with the plungers 67 and 393.

In operation, when the lever 581 is in the "neutral" position, the linkage will cause the plunger 571 to be fully inserted into the axial bore 569 so as to cause both of the balls 561 and 563 to be displaced radially outwardly into respective positions preventing movement to the left of the sheave 517 from the retracted position in a direction toward the fixed sheave 515 and preventing movement of the spider 531 to the right from the predetermined position away from the fixed sheave 515.

Movement of the lever 581 to the "performance drive" position partially withdraws the plunger 571 so that the movable sheave releasing ball 561 is permitted to move inwardly into a recess land or portion 595 in the plunger 571 and out of position interfering with movement of the movable sheave 517 to the left toward the fixed sheave 515. At the same time, however, the ball 563 controlling movement of the spider 531 is maintained in extended or interfering position preventing movement of the spider 531 to the right. Accordingly, rotation of the drive shaft 513 will cause the fly weights 539 to move outwardly and to react against the rollers carried on the spider 531 which is prevented from moving in the direction away from the fixed sheave 515. Thus, the sheave 517 is caused to move to the left in response to a relatively high drive shaft speed as compared to operation under conditions when the assembly is in the "trail drive" or "cruise drive" condition.

Further in this regard, when the lever 581 is moved to the "trail drive" position, the plunger 571 is further withdrawn from the axial bore 569 with the result that the ball 561 controlling movement of the sheave 517 is retained in its withdrawn or retracted position and with the result that a recess 597 on the plunger 571 comes into alignment with the ball 563 controlling movement of the spider 531 so as to allow the ball 563 to move radially inwardly and out of position interfering with movement of the spider 531 to the right as shown in FIGS. 9 through 11. Accordingly, radially outward movement of the fly weight 539 initially has the effect of moving the spider 531 to the right against the action of the spring 533 to the "cruise drive" position shown in FIG. 10. Thereafter, drive belt engaging movement of the sheave 517 to the left will occur at a lower rate of drive shaft rotation and will accordingly permit initial torque transmission at lower rotary speeds than is possible when the spider 531 is retained in the predetermined or "performance drive" position.

When the plunger 571 is in the "neutral" position, it is preferred that the ball controlling movement of the spider 531 be retained in the position interfering with movement of the spider 531 to the right.

Various features of the invention are set forth in the following claims.

What is claimed is:

1. A variable transmission drive pulley assembly comprising a drive shaft, a fixed sheave connected to said drive shaft for common rotation therewith, a movable sheave carried by said drive shaft for movement axially thereof relative to a retracted position spaced from said fixed sheave, means urging said movable sheave toward said retracted position in the direction away from said fixed sheave, speed responsive means for displacing said movable sheave toward said fixed sheave, additional means movable relative to said fixed sheave for modifying the effectiveness of said speed responsive means, and control means operative independently of the rotation of said drive shaft for selectively preventing displacement of said movable sheave toward said fixed sheave by said speed responsive means and for selectively controlling operation of said additional means for modifying the effectiveness of said responsive means.

2. A variable transmission drive pulley assembly in accordance with claim 1 wherein said means for modifying the effectiveness of said speed responsive means is operative independently of the rate of rotation of said drive shaft.

3. A variable transmission drive pulley assembly in accordance with claim 1 wherein said means for modifying the effectiveness of said speed responsive means includes means operatively engagable directly with said speed responsive means.

4. A variable transmission drive pulley assembly in accordance with claim 1 wherein said means for modifying the effectiveness of said speed responsive means includes additional means responsive to drive shaft rotation.

5. A variable transmission drive pulley assembly in accordance with claim 1 wherein said means for modifying the effectiveness of said speed responsive means includes means for biasing said movable sheave axially of said drive shaft.

6. A variable transmission drive pulley assembly in accordance with claim 1 wherein said means for modifying the effectiveness of said speed responsive means includes a member at least in part supporting said speed responsive means and mounted on said drive shaft for common rotation therewith and for movement axially thereof.

7. A variable transmission drive pulley assembly in accordance with claim 1 wherein said control means includes releasable means for preventing sheave displacing operation by said speed responsive means.

8. A variable transmission drive pulley assembly in accordance with claim 7 wherein said releasable means for preventing sheave displacing operation by said speed responsive means comprises releasable means interfering with movement of said movable sheave from said retracted positon.

9. A variable transmission drive pulley assembly in accordance with claim 7 wherein said releasable means for preventing sheave displacing operation by said speed responsive means comprises releasable means engagable with said speed responsive means for preventing operation thereof to displace said movable sheave toward said fixed sheave.

10. A variable transmission drive pulley assembly in accordance with claim 1 wherein said control means includes releasable means for preventing operation of said means for modifying the effectiveness of said speed responsive means.

11. A variable transmission drive pulley assembly in accordance with claim 1 wherein said control means includes releasable means for preventing sheave displacing operation of said speed responsive means, and releasable means for preventing operation of said means for modifying the effectiveness of said speed responsive means.

12. A variable transmission drive pulley assembly in accordance with claim 1, and further including a steering handle bar on a vehicle, a member movably mounted on said handle bar remotely from said control means, and a linkage connecting said member and said control means for actuation of said control means in response to movement of said member.

13. A variable transmission drive pulley assembly comprising a drive shaft, a fixed sheave connected to said drive shaft for common rotation therewith, a movable sheave carried by said drive shaft for common rotation therewith and for movement axially thereof toward and away from said fixed sheave, means urging said movable sheave away from said fixed sheave, means responsive to drive shaft rotation for displacing said movable sheave toward said fixed sheave, additional means for displacing said movable sheave toward said fixed sheave, releasable means for preventing movement of said movable sheave toward said fixed sheave, and selectively operable control means for controlling operation of said additional means for displacing said movable sheave toward said fixed sheave and said releasable means for preventing movement of said movable sheave toward said fixed sheave.

14. A variable transmission drive pulley assembly in accordance with claim 13 wherein said additional sheave displacing means comprises a biasing spring.

15. A variable transmission drive pulley assembly in accordance with claim 14 wherein said additional sheave displacing means further comprises a member movable between positions spaced axially of said shaft, and wherein said spring urges said member in the direction of movement of said movable sheave toward said fixed sheave.

16. A variable transmission drive pulley assembly in accordance with claim 15 and further including releasable means for preventing movement of said member from one of said positions to the other of said positions.

17. A variable transmission drive pulley assembly in accordance with claim 16 wherein said drive shaft includes therein an axial bore, a first radial bore extending from said axial bore, a second radial bore extending from said axial bore in axially spaced relation to said first radial bore, and wherein said sheave movement preventing means is located in said first radial bore and said member movement preventing means is located in said second bore, and wherein said control means comprises a plunger in said bore movable between first, second and third positions and including first means for engaging said sheave movement preventing means to displace said sheave movement preventing means radially outwardly into engagement with said movable sheave to prevent movement thereof toward the fixed sheave when said plunger is in said first position and second means on said plunger for engaging said member movement preventing means to displace said member movement preventing means into engagement with said member to prevent movement thereof from said one position toward said other position.

18. A variable transmission drive pulley assembly comprising a drive shaft, a fixed sheave connected to said drive shaft for common rotation therewith, a movable sheave carried by said drive shaft for movement axially thereof toward and away from said fixed sheave, means urging said movable sheave away from said fixed sheave, first means for displacing said movable sheave axially of said drive shaft toward said fixed sheave, second means for displacing said movable sheave axially of said drive shaft, and control means operable selectively and independently of the rotation of said drive shaft for controlling operation of said first and second means for displacing said movable sheave.

19. A variable transmission drive pulley assembly in accordance with claim 18 wherein said control means is selectively operble to prevent displacement of said movable sheave toward said fixed sheave by said first and second means, to permit displacement of said movable sheave toward said fixed sheave by said first and second means, and to permit displacement of said movable sheave toward said fixed sheave by said first means, while preventing displacement of said movable sheave toward said fixed sheave by said second means.

20. A variable transmission drive pulley assembly in accordance with claim 18 wherein said control means includes an element movable between first, second, and third positions, means connecting said element and said first means to prevent operation thereof to displace said movable sheave toward said fixed sheave when said element is in said first position, and means connecting said element and said second means for preventing operation thereof to displace said movable sheave toward said fixed sheave when said element is in said third position.

21. A variable transmission drive pulley assembly in accordance with claim 18 wherein said control means comprises an actuator movable axially of said drive shaft between first, second, and third positions, a movably mounted control arm, spring means biasing said control arm for movement in one direction, co-operable means on said control arm and on said actuator for displacing said control arm against the action of said spring means in response to movement of said actuator in one direction axially of said drive shaft and for permitting displacement of said control arm by said spring means in response to movement of said actuator in the other direction axially of said drive shaft, means on said control arm and said first means for engagement therebetween to prevent displacement by said first means of said movable sheave toward said fixed sheave in response to drive shaft rotation when said actuator is in said first position, and means on said control arm and on said second means for engagement therebetween to prevent displacement by said second means of said movable sheave toward said fixed sheave in response to drive shaft rotation when said actuator is in said third position.

22. A variable transmission drive pulley assembly in accordance with claim 18 wherein said first means comprises means responsive to drive shaft rotation and wherein said second means is also responsive to drive shaft rotation and is engageable with said first means to assist said first means in displacing said movable sheave toward said fixed sheave.

23. A variable transmission drive pulley assembly in accordance with claim 22 wherein said first speed responsive means comprises a pivotally mounted first weight and wherein said second speed responsive means comprises an assist weight pivotally mounted co-axially with said first weight, and wherein said first wieght and said assist weight include interengaging parts whereby pivotal movement of said assist weight in response to drive shaft rotation serves to engage said assist weight against said first weight.

24. A variable transmission drive pulley assembly in accordance with claim 23 wherein said control means comprises an actuator movable axially of said drive shaft between first, second, and third positions, a movably mounted control arm, spring means biasing said control arm for movement in one direction, co-operable means on said control arm and on said actuator for displacing said control arm against the action of said spring means in response to movement of said actuator in one direction axially of said drive shaft and for permitting displacement of said control arm by said spring means in response to movement of said actuator in the other direction axially of said drive shaft, means on said control arm and on said first weight for engagement therebetween to permit movement of said first weight in response to drive shaft rotation when said actuator is in said second and third positions and to prevent movement of said first weight in response to drive shaft rotation when said actuator is in said first position, and means on said control arm and on said assist weight for engagement therebetween to prevent movement of said assist weight in response to drive shaft rotation when said actuator is in said first and second positions and for permitting movement of said assist weight in response to drive shaft rotation when said actuator is in said third position.

25. A variable transmission drive pulley in accordance with claim 24 wherein said control means comprises a bore in said drive shaft, a radial opening in said shaft communicating with said bore, and a plunger movable in said bore and including a part extending through said opening and connected to said actuator to displace said actuator axially of said drive shaft in response to movement of said plunger in said bore.

26. A variable transmission drive pulley assembly comprising a drive shaft, a first sheave fixedly connected to said drive shaft for common rotation therewith, a second sheave movably carried on said drive shaft for common rotation therewith and for movement axially thereof from a retracted position spaced from said first sheave, means urging said second sheave toward said retracted position in the direction away from said first sheave, a member carried on said drive shaft for common rotation therewith and for movement axially thereof relative to a predetermined position, means biasing said member toward said predetermined position in the direction toward said first sheave, means carried by said second sheave and said member for displacing said second sheave and said member away from each other in response to drive shaft rotation, releasable means for preventing movement of said second sheave from said retracted position in the direction toward said first sheave, releasable means for preventing movement of said member from said predetermined position in the direction away from said first sheave, and selectively operable means for actuating said releasable means so as to prevent movement of said second sheave from said retracted position toward said first sheave, to prevent movement of said member away from said predetermined position in the direction away from said first sheave while permitting movement of said second sheave from said retracted position in the direction toward said first sheave, and to permit movement of said second sheave from said retracted position in the direction toward the fixed sheave while also permitting movement of said member from said predetermined position in the direction away from said first sheave.

27. An assembly in accordance with claim 26 and further including means for limiting movement of said member from said predetermined position in the direction away from said fixed sheave and means adjusting the location of said means limiting movement of said member.

28. An assembly in accordance with claim 26 wherein said selectively operable actuating means comprises an axial bore in said drive shaft, a plunger axially movable in said drive shaft bore, a movably mounted actuating lever located remotely from said plunger and adapted to be manually manipulated, and means connecting said plunger and said lever to axially displace said lever in accordance with manipulation of said lever.

29. An assembly in accordance with claim 28 wherein said releasable means comprise axially spaced first and second radial bores communicating with said axial bore, and first and second elements respectively located in said first and second radial bores and respectively movable between radially inner retracted positions and radially outer interfering positions respectively interfering with movement of said second sheave from said retracted position and with movement of said member from said predetermined position.

30. An assembly in accordance with claim 29 wherein said plunger includes a plurality of lands cooperating with said first and second elements to selectively displace said first and second elements radially outwardly to said interfering positions and to permit said elements to move radially inwardly to said retracted positions in accordance with the axial position of said plunger.

* * * * *

UNITED STATES PATENT OFFICE
CERTIFICATE OF CORRECTION

Patent No. 3,939,720      Dated February 24, 1976

Inventor(s) Olav Aaen and Edgar Rose

It is certified that error appears in the above-identified patent and that said Letters Patent are hereby corrected as shown below:

Column 19, line 18      before "responsive", insert ---speed---.

Signed and Sealed this

First Day of March 1977

[SEAL]

Attest:

RUTH C. MASON
Attesting Officer

C. MARSHALL DANN
Commissioner of Patents and Trademarks